Patented Feb. 5, 1952

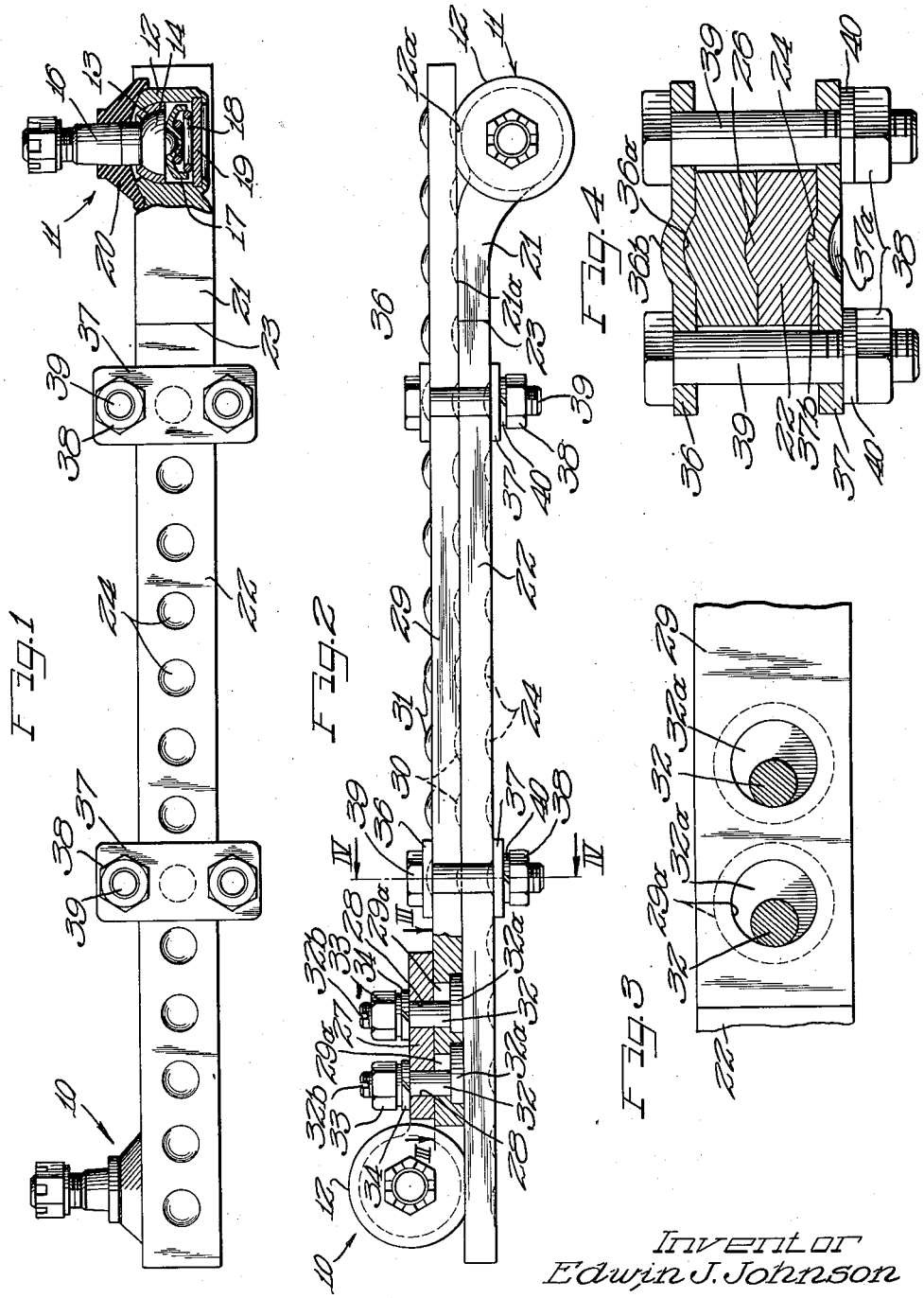

2,584,709

UNITED STATES PATENT OFFICE 2,584,709

ADJUSTABLE TIE ROD

Edwin J. Johnson, Detroit, Mich., assignor to Thompson Products, Inc., Cleveland, Ohio, a corporation of Ohio Application November 22, 1949, Serial No. 128,763

11 Claims. (Cl. 287—58)

This invention relates generally to an adjustable joint adapted to vary the spacing dimension between axially separated centers and more particularly relates to an adjustable tie rod assembly for a vehicular steering assembly.

The present invention, although of general utility, finds a particularly useful application on a vehicle such as a row crop tractor in which it is desirable to vary the span of the front wheels, thus necessitating adjusting the spacing dimension between tie rod ball centers.

In adjustable tie rod apparatus heretofore provided, the adjustable members usually consisted of a male socket member slidable within a tubular socket member. Most of the designs provided have been seriously deficient insofar as adjustability is concerned because the range of adjustment has been completely dependent upon the length of the shortest link.

According to the general features of the present invention, an adjustable tie rod assembly is porvided which can be collapsed beyond the length of its shortest member. This assembly has a shank on one tie rod joint socket flattened to an approximately rectangular shape and offset from the axis of the joint. A rectangular bar is affixed to the flattened socket shank and may be impressed with a plurality of spherical impressions thus causing an equal number of spherical protrusions to extend on the opposite side of the bar.

The other tie rod joint socket is provided with a similarly impressed, flattened and offset shank but has bolt holes therein. This shank is bolted to a second rectangular bar impressed with a plurality of mating spherical impressions. The bolts employed preferably have round heads eccentric to the center lines thereof and are adapted to be seated in a suitable counterbore portion in the bar.

The two rectangular bars are clamped together by means of clamp devices in various adjusted positions according to the ball center length which must be obtained for different wheel spacings. Small lengthwise adjustments may be obtained for accurate toe in of the vehicle by rotatably positioning the bolts.

The offset shanks with their aligned bars permit overlapping of the bars and side faces of the socket bearings even when the bars are in face to face engagement.

It is thus an object of this invention to provide a tie rod and tie rod joint assembly which has overlapped bar portions with selectively registering protuberances and recesses producing an assembly with an adjustable length.

Another object of this invention is to provide an adjustable joint linkage wherein the range of adjustment is independent of the axial length of the joint elements.

A further object of the present invention is to provide an adjustable joint linkage wherein small incremental adjustments in the axial length of the joint may be effected by adjustment means independent of the usual adjustment mechanism.

Yet another object of the present invention is to provide an adjustable joint linkage which may be inexpensively stamped and punched from bar stock.

Many other advantages, features and additional objects of the present invention will become manifest to those versed in the art upon making reference to the detailed description which follows in the accompanying sheet of drawings in which:

Figure 1 is an elevational view, partly in section, of an adjustable tie rod according to the present invention;

Figure 2 is a bottom plan view, partly in section, of the adjustable tie rod shown in Figure 1;

Figure 3 is a fragmentary enlarged cross-sectional view taken on line III—III of Figure 2; and Figure 4 is an enlarged detail cross-sectional view taken on line IV—IV of Figure 2.

As shown on the drawings:

For purposes of clarity in explanation, the present invention is described with particular reference to one form of a tie rod apparatus wherein the distance between ball centers may be adjusted to numerous lengths. As shown on the drawings the ball centers are established by a first socket 10 and a second socket 11.

Each of the sockets 10 and 11 may be identically constructed and includes a housing 12 in which is positioned a segmented spherical bearing 13 seating a ball head 14 situated on the end of a stud 16. The ball head 14 is urged upwardly by a retainer 17 biased by a spring 18 which is seated on a closure plate 19. After assembly of the socket elements, the closure plate 19 may be conveniently locked in place by peening over the edges of the housing 12. A dust cover 20 may also be provided for the socket.

The housing 12 of the socket 11 is provided with a shank 21 flattened to an approximately rectangular shape and offset from the joint axis to position its face 21a flush with or beyond a flattened side face 12a of the housing 12.

A rectangular bar 22 is affixed to the socket shank 21, for example, by butt welding as at 23. The rectangular bar 22 thutt defines a stem for the socket 11.

The bar or stem 22 is provided with a plurality of spaced male and female positioning means which preferably take the form of a number of spherical impressions 24 stamped or pressed into one face of the bar or stem 22 so as to produce an equal number of spherical protrusions 26 on the opposite face thereof.

The socket 10 has its housing 12 provided with a flattened offset shank 27 which is preferably apertured as at 28 to provide bolt holes therethrough.

An elongated rectangular bar 29 similar to the bar 22 is also provided with a plurality of male and female positioning means in the form of recesses or spherical impressions 30 and protrusions 31.

The shank 27 is bolted to the bar 29 by means of one or more clamping bolts 32 having round heads 32a which are eccentrically disposed relative to the center lines of the bolt stems. The bar 29 has counterbored apertures 29a to receive the bolt heads 32a and to provide holes for the bolts 32 of sufficient size to permit rotation thereof.

The ends of the bolts 32 are preferably slotted as at 32b for cooperation with an adjustment tool such as a screw driver or the like and are also threaded to receive locking nuts 33. Lock washers 34 may also be provided.

By rotating the heads 32a of the bolts 32 in their respective counterbored apertures 29a, the center line of the bolt stems may be moved backwards and forwards on the bar 29, thereby effecting small incremental adjustments in the axial length of the adjustable joint. This feature is especially desirable when the adjustable tie rod of the present invention is employed on a vehicle such as a row crop tractor since it permits accurate adjustment of what is known in the art as "toe in." It may be noted that the slots 32b provided in the bolts 32 not only facilitate adjustment of the bolts but permit the bolts to be held in position when tightening the nuts 33 as when the bolts are to be locked in adjusted position.

It should be apparent from the nature of the structure thus far described that the bar 29 actually functions as a stem for the socket 10 and that both the bar or stem 22 and the bar 29 may be adjusted to selectively vary the axial length of the joint by relocating the stems and remating the positioning means.

In order to lock the stems of the sockets 10 and 11 in various adjustment positions, a clamping mechanism is provided. The particular form of clamping mechanism herein embodied includes a pair of plate elements which are indicated by the reference numerals 36 and 37 respectively and which may be positioned on opposite sides of the stems when the stems are assembled in abutting relationship to one another. The plates 36 and 37 may be placed in clamping engagement with the stems upon tightening a pair of nuts 38 upon a pair of bolts 39.

As may be seen in Figure 4, each plate element 36 and 37 may be provided with a female recess 36a and 37a respectively and a male protuberance 36b and 37b respectively. The plates 36 and 37 may thus be cooperatively seated in mating relationship to the bar or stem 22 and the bar 29 at predetermined axial positions along the length thereof so that the mating relationship of the clamping plates and the stems will produce an integrated locked together joint. It will be understood that lock washers 40 may be provided on the bolts 39.

The provision of an adjustable joint according to the description above permits minimum adjustment to be made in the length between spaced centers even though such length is less than the length of the joint elements since it is possible to have the end of one stem protrude beyond the socket affixed to the other stem, thereby permitting a greater degree of adjustment than has been possible heretofore.

It will also be apparent that the adjustable joint of the present invention may be produced with great economy since the punched or pressed male and female positioning means are far less expensive than most other types of connections and yet may be employed with great efficiency.

Although a person skilled in the art might suggest various minor modifications to the preferred embodiment herein described by way of illustrative example only, it should be understood that I do not propose to be limited to the precise details set out for the sake of clarity but wish to embrace within the scope of this patent all such modifications as reasonably and properly come within the scope of my contribution to the art.

I claim as my invention:

1. A tie rod and tie rod joint assembly having an adjustable effective length adapted to be reduced beyond the length of the shortest link thereof, which comprises a pair of tie rod joints each having a housing carrying a stud projecting therefrom in tiltable and rotatable relation and having an elongated laterally extending stem, said stems having a row of longitudinally spaced dimples and protuberances on opposite faces thereof, clamps embracing the stems and locking the stems in selectively overlapped positions with the dimples and protuberances in nested relation, said clamps having dimples and protuberances respectively receiving the underlying protuberance and dimple of the stem portions embraced thereby, and said stems being positioned relative to said housings for overlapping the housings in abutting relation when the assembly is collapsed to a length shorter than the length of the stems, whereby said studs can be positioned in adjustable spaced relation.

2. An adjustable tie rod apparatus for vehicular steering assembly comprising, in combination, a first socket member, a bar-like stem affixed thereto, a second socket member, a bar-like stem affixed thereto, and a plurality of mating male and female positioning means defined in abutting surfaces of the stems, said stems being adjustable to selectively vary the axial spacing dimension between the socket members by relocating the stems and remating the positioning means and means to retain said stems in adjusted abutting assembly, said socket members and said stems being relatively offset for axially positioning said socket members closer than the lengths of said stems.

3. An adjustable tie rod apparatus for a vehicular steering assembly comprising a first socket member, a second socket member, a pair of bar-like stems, one stem being affixed to each respective socket member, a plurality of mating male and female positioning means defined in abutting surfaces of the stems for locked together engagement and clamping means to lock the stems in selectively varied axial positions upon location of the stems in mating relationship, said socket members and said stems being relatively offset for axially positioning said socket members closer than the length of said stems.

4. An adjustable tie rod apparatus for a vehicular steering assembly comprising in combination, a first socket member, a bar-like stem affixed thereto, a second bar-like stem, both of said stems being provided with a plurality of mating male and female positioning means defined in abutting surfaces of the stems, said second bar-like stem being provided with a counterbored aperture, a second socket member having an apertured shank portion, a rotatable bolt having an eccentric head, said bolt being inserted through the apertured shank portion and having said eccentric head inserted into the counterbored aperture for locking the second socket member to the second bar-like stem, whereby the stems may be relocated and remated to selectively vary the axial length of the tie rod and small incremental adjustments in the axial length of the tie rod may be effected by a rotational adjustment of the bolt, and means to lock said first and second bar-like stems in adjusted abutting assembly.

5. An adjustable joint adapted to vary the spacing dimension between axially separated centers comprising a first stem, a second stem to abut the first stem, a plurality of mating male and female positioning means defined in abutting surfaces of the stems, said stems being adjustable to selectively vary the axial length of the joint by relocating the stems and remating the positioning means, clamping means to lock the adjustable joint in locked-together relationship, and center-defining means offset from said first and second stems for axially positioning said center-defining means closer than the lengths of said first and second stems.

6. An adjustable joint adapted to vary the spacing dimension between axially separated centers comprising a first stem, a second stem to abut the first stem, a plurality of mating male and female positioning means defined in abutting surfaces of the stems, said stems being adjustable to selectively vary the axial length of the joint by relocating the stems and remating the positioning means, a third stem, an adjustable connection between the third stem and one of the other stems, linearly adjustable elements to effect small incremental adjustments in the axial length of the joint, and means to lock said first and second stems in adjusted abutting assembly.

7. An adjustable joint adapted to vary the spacing dimension between axially separated centers comprising a first stem, a second stem to abut the first stem, a plurality of mating male and female positioning means defined in abutting surfaces of the stems, said stems being adjustable to selectively vary the axial length of the joint by relocating the stems and remating the positioning means, clamping means to lock the adjustable joint in locked together relationship, a third stem, a movably adjustable connection between the third stem and one of the other stems including linearly adjustable elements to effect small incremental adjustments in the axial length of the joint, and center-defining means on opposite ends of said joint offset axially relative to said stems to axially position said center-defining means closer than the lengths of said first and second stems.

8. An adjustable joint adapted to vary the spacing dimension between axially separated centers comprising a bar-like element defining a first stem, a bar-like element defining a second stem, both of said stems defining a plurality of spaced protrusions and recesses on opposite faces thereof forming mating male and female positioning means on their abutting surfaces, said stems being adjustable to selectively vary the length of the joint by relocating the stems and remating the positioning means and clamping means to lock the stems in adjusted positions, said clamping means having mating portions cooperable with the stem protrusions and recesses to positively seat at predetermined axial positions along the length of the joint.

9. An adjustable joint adapted to vary the spacing dimension between axially separated centers comprising a bar-like element defining a first stem, a bar-like element defining a second stem, both of said stems defining a plurality of spaced protrusions and recesses on opposite faces thereof forming mating male and female positioning means on their abutting surfaces, said stems being adjustable to selectively vary the length of the joint by relocating the stems and remating the positioning means, clamping means to lock the stems in adjusted position, said clamping means having mating portions cooperable with the stem protrusions and recesses to positively seat at predetermined axial positions along the length of the joint, a third stem, and a movably adjustable connection between the third stem and one of the other stems to effect small incremental adjustments in the axial length of the joint.

10. In an adjustable joint, a pair of stems relatively adjustable to vary the spacing dimension between axially separated centers, means to lock the stems in adjusted position, a third stem defining an aperture, a rotatable bolt in said aperture and having an eccentric head, and a cooperating counterbore defined in one of the pair of stems to receive the eccentric head of said bolt, whereby small incremental adjustments in the axial length of the joint may be effected by rotational adjustment of the bolt.

11. In an adjustable joint, a pair of stems relatively adjustable to vary the spacing dimension between axially separated centers, means to lock the stems in adjusted position, a third stem defining an aperture, a rotatable bolt in said aperture and having an eccentric head portion, and a cooperating counterbore defined in one of the pair of stems to receive the eccentric head portion of said bolt, whereby small incremental adjustments in the axial length of the joint may be effected by a rotational adjustment of the bolt, and means to lock the rotatable bolt in adjusted position.

EDWIN J. JOHNSON.

REFERENCES CITED

The following references are of record in the file of this patent:

UNITED STATES PATENTS

| Number | Name | Date |
|---|---|---|
| 730,932 | Lawler et al. | June 16, 1903 |
| 1,097,185 | Oehrle | May 19, 1914 |
| 1,301,971 | Reed | Apr. 29, 1919 |
| 2,049,502 | Hufferd et al. | Aug. 4, 1936 |
| 2,077,620 | Dicke | Apr. 20, 1937 |

FOREIGN PATENTS

| Number | Country | Date |
|---|---|---|
| 13,659 | Switzerland | Nov. 23, 1896 |